(12) United States Patent
Chao et al.

(10) Patent No.: US 9,277,331 B2
(45) Date of Patent: Mar. 1, 2016

(54) TECHNIQUES FOR TESTING COMPATIBILITY OF A WIRELESS COMMUNICATION DEVICE

(71) Applicant: PCTEST Engineering Laboratory, Inc., Columbia, MD (US)

(72) Inventors: Justin Chao, Ellicott City, MD (US); Stephen S Liu, Columbia, MD (US); Andrew Harwell, Columbia, MD (US); Randy Ortanez, Columbia, MD (US)

(73) Assignee: PCTEST Engineering Laboratory, Inc., Columbia, MD (US)

( * ) Notice: Subject to any disclaimer, the term of this patent is extended or adjusted under 35 U.S.C. 154(b) by 243 days.

(21) Appl. No.: 14/188,460

(22) Filed: Feb. 24, 2014

(65) Prior Publication Data

US 2015/0245230 A1 Aug. 27, 2015

(51) Int. Cl.
*H04R 25/00* (2006.01)
*H04M 1/725* (2006.01)
*H04M 1/24* (2006.01)
*H04B 17/00* (2015.01)

(52) U.S. Cl.
CPC .............. *H04R 25/30* (2013.01); *H04B 17/00* (2013.01); *H04M 1/24* (2013.01); *H04M 1/72591* (2013.01); *H04R 25/305* (2013.01)

(58) Field of Classification Search
CPC .... H04R 25/30; H04R 25/305; H04R 25/554; H04R 2225/55; H04M 1/24; H04M 1/72591; H04W 24/06; H04W 24/08
See application file for complete search history.

(56) References Cited

U.S. PATENT DOCUMENTS

| | | | | |
|---|---|---|---|---|
| 6,603,860 B1* | 8/2003 | Taenzer | ................. | H04R 25/30 381/312 |
| 7,787,647 B2* | 8/2010 | Hagen | .................... | H04R 25/70 381/312 |
| 8,115,682 B2* | 2/2012 | Chang | .................... | H01Q 1/245 343/700 MS |
| 8,340,336 B1* | 12/2012 | Frerking | ................ | H04R 9/025 379/443 |
| 8,503,703 B2* | 8/2013 | Eaton | ..................... | H04R 25/70 381/312 |
| 2006/0025172 A1* | 2/2006 | Hawker | ........... | H04M 1/72522 455/556.1 |
| 2007/0003088 A1* | 1/2007 | Lehtola | .................. | H01Q 1/243 381/330 |
| 2008/0151982 A1* | 6/2008 | Qi | ...................... | G01R 29/0857 375/227 |
| 2012/0177235 A1* | 7/2012 | Solum | .................... | H04R 25/30 381/315 |
| 2013/0272555 A1* | 10/2013 | Dave | ...................... | H04R 25/50 381/317 |
| 2014/0307902 A1* | 10/2014 | Ku | ......................... | H04R 25/30 381/315 |
| 2015/0245230 A1* | 8/2015 | Chao | .................... | H04W 24/06 370/241 |

* cited by examiner

Primary Examiner — Matthew Eason

(57) ABSTRACT

Techniques for testing a wireless communications device are disclosed. In one particular exemplary embodiment, the techniques may be realized as a system and method for testing a wireless communications device. The method may comprise generating an audio test signal. The audio test signal may be transmitted to a wireless communication device through a wireless base station simulator via a VoIP application. The method may also comprise receiving an output signal, where the output signal may be generated by the wireless communication device and transmitted to a telecoil probe. The method may further comprise processing the output signal by comparing the output signal with the audio test signal.

20 Claims, 4 Drawing Sheets

TECHNIQUES FOR TESTING COMPATIBILITY OF A WIRELESS COMMUNICATION DEVICE

FIELD OF THE DISCLOSURE

The present disclosure relates generally to the field of hearing aid technology and, more particularly, to techniques for testing a wireless communication device for compatibility with a telecoil (T-coil) device.

BACKGROUND

Modern hearing aids are capable of receiving an audio signal directly from an audio source, such as a wireless communication device. For example, a hearing aid may contain an integrated T-coil component to receive the audio signal from the wireless communication device over a magnetic field. Due to the nature of wireless communication, T-coil technology is regulated by the Federal Communications Commission ("FCC"), which requires wireless communication devices implementing T-coil functionality to be thoroughly tested to ensure compatibility and compliance with FCC regulations. However, no method currently exists to provide testing of T-coil compatibility associated with a Long Term Evolution (LTE) signal. In view of the foregoing, it may be understood that there may be significant problems and shortcomings associated with current testing technologies.

SUMMARY

Techniques for testing a wireless communications devices are disclosed. In one particular embodiment, the techniques may be realized as a system for testing a wireless communication device, comprising an audio test system, a wireless base station simulator, a wireless communication device, a source VoIP application, a client VoIP application, and a telecoil probe. The wireless communication device may be configured to receive, at the wireless communication device, an audio test signal from the wireless base station simulator. The audio test signal may be transmitted via the source VoIP application. The wireless communication device may further generate an output signal in response to the audio test signal and transmit an output signal to the telecoil probe, the telecoil probe being communicatively coupled to the audio test system for testing the wireless communication device. In accordance with other aspects of this particular embodiment, the client VoIP application may be in the wireless communications device. The wireless base station simulator may be an LTE base station simulator. The output signal may be amplified after being received by the telecoil probe. The audio test signal may be generated by the audio test system. The audio test system may process the output signal by comparing the output signal with the audio test signal.

In another particular embodiment, the techniques may be realized as a method for testing a wireless communications device, comprising receiving, at a wireless communication device, an audio test signal from a wireless base station simulator, the audio test signal being transmitted from a source Voice over Internet Protocol (VoIP) application to a client VoIP application, generating an output signal in response to the audio test signal, and transmitting the output signal to a telecoil probe, the telecoil probe being communicatively coupled with an audio test system configured to test the wireless communication device. In accordance with other aspects of this particular embodiment, the client VoIP application may be in the wireless communications device. The wireless base station simulator may be an LTE base station simulator. The output signal may be amplified after being received by the telecoil probe. The audio test signal may be generated by the audio test system. The audio test system may test the wireless communication device by at least comparing the output signal with the audio test signal. A non-transitory computer-readable storage medium storing a computer program of instructions configured to be readable by at least one computer processor may instruct the at least one computer processor to execute a computer process for performing the method.

In another particular embodiment, the techniques may be realized as a method for testing a wireless communications device, comprising generating an audio test signal, the audio test signal being transmitted to a wireless communication device through a wireless base station simulator from a source VoIP application to a client a VoIP application, receiving an output signal, the output signal being generated by the wireless communication device and transmitted to a telecoil probe, and processing the output signal by comparing the output signal with the audio test signal. In accordance with other aspects of this particular embodiment, the client VoIP application may be in the wireless communications device. The wireless base station simulator may comprise an LTE base station simulator. The output signal may be amplified after being received by the telecoil probe. The processing the output signal may further comprise breaking the output signal a spectrum of ⅓ octave bands. The generating the audio test signal may further comprise generating a 1 kHz tone. A non-transitory computer-readable storage medium storing a computer program of instructions configured to be readable by at least one computer processor may instruct the at least one computer processor to execute a computer process for performing the method of claim 14.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
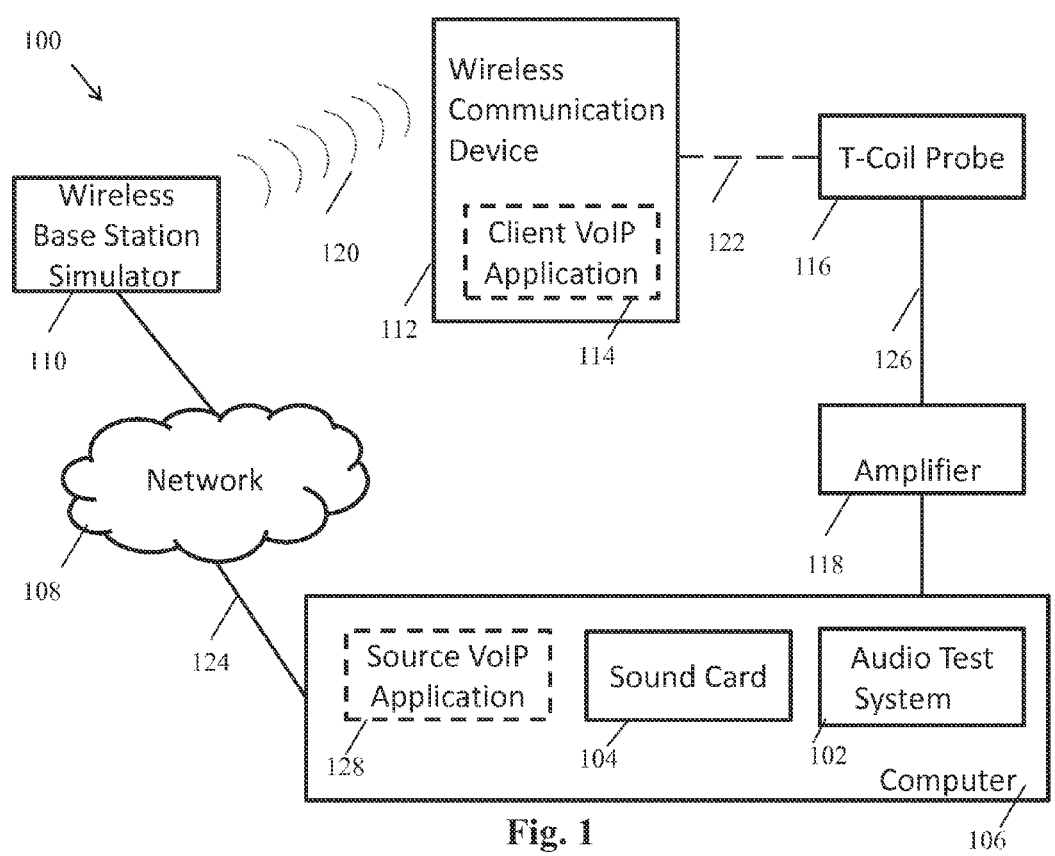
FIG. 1 depicts an illustrative system architecture for testing compatibility of a wireless device in accordance with an exemplary embodiment.

Embodiments disclosed herein provide techniques for testing a wireless communication device. More specifically, hearing aid compatibility (HAC) may be tested on the wireless communication device using voice over internet protocol (VoIP) software. For example, an audio test system may generate an audio test signal. A computer may transmit the audio test signal over a network to a wireless base station simulator. The test signal may be broadcast by the wireless base station simulator, for example, over Long Term Evolution (LTE) to a wireless communication device using a VoIP application. The wireless communication device may broadcast an output signal to a telecoil probe. The output signal may be provided via an amplifier to a sound test program at the audio test system.

Modern hearing aids are typically battery powered devices capable of amplifying acoustic sounds to a level desired by the user. This technology may, however, suffer from amplification of unwanted noise, making hearing in a loud environment particularly difficult.

A recent advance in the field of hearing aid technology is the inclusion of telecoil (T-coil) devices within hearing aids. A T-coil permits amplification of an audio signal transmitted over a magnetic field from a compatible source. A T-coil detects a magnetic signal through an induction loop and converts the magnetic signal to an electrical signal used by a hearing aid, for example, to create an amplified sound.

T-coil devices may be used in telephones or other systems that produce a direct audio output feed. Many mobile phones and wireless communication devices are equipped with T-coil technology. To ensure that these devices perform in accordance with FCC regulations, such communication devices and hearing aids may be tested regularly.

To test a wireless communication device, the wireless communication device's communication link to a cellular base station may be simulated. For example, a wireless base station simulator may be used to communicate with a wireless communication device, and mimic potential situations encountered by the wireless communication device. In one embodiment, a wireless base station simulator may simulate Long Term Evolution (LTE) wireless technology, but may couple the implementation of an LTE base station with a voice transmission technology.

In this scenario, an application implementing VoIP technology may be provided to the wireless communication device. The application, for example, may connect to a network via the LTE communication link provided by the wireless base station simulator. The application may further connect, via the LTE link, to an audio test system remote to the wireless communication device that provides an audio test signal. The wireless communication device may provide the audio test signal as an output signal to an embedded T-coil transmitter. A T-coil probe may receive the output signal. The output signal may be provided by the T-coil probe back to the audio test system for comparison to the audio test signal. The audio test system may perform a test of the wireless communication device by at least comparing the output signal with the audio test signal.

FIG. 1 depicts an illustrative system architecture for testing compatibility of a wireless communication device in accordance with an exemplary embodiment of the disclosure. Referring to FIG. 1, the system architecture 100 may include an audio test system 102, a sound card 104, a computer 106, a wireless base station simulator 110, a wireless communication device 112, a client VoIP application 114, a T-coil probe 116, an amplifier 118, a data communications link 120, a T-coil communications link 122, an audio test signal 124, an output signal 126, and a source VoIP application 128. The computer 106 and the wireless base station simulator 110 may be communicatively coupled to a network 108. The wireless communication device 112 may be communicatively coupled to the wireless base station simulator 110 over LTE or other wireless communication protocol. The T-coil probe 116 may be communicatively coupled to the wireless communication device 112. It should be appreciated that the links between the various components of FIG. 1 may be wired or wireless.

In some embodiments, the client VoIP application 114 may communicate with the source VoIP application 128 via the data communications link 120 and the network 108, as shown in FIG. 1. In other embodiments, the source VoIP application 128 may also be distinct or remote from the computer 106. For example, the source VoIP application 128 may be included in another external component (not shown) or in the network 108. Other various embodiments may also be provided.

The audio test system 102 may be a component of the computer 106 capable of generating an audio test signal 124. The audio test system 102 may be communicatively coupled to the sound card 104 and the amplifier 118. The links between the audio test system 102 and the sound card 104, and the links between audio test system 102 and amplifier 118 may be wireless or wired, as described above. In one embodiment, both of these links may be provided over a wired ¼-inch audio cable. The audio test system 102 may be configured to generate the audio test signal 124 from the sound card 104 of the computer 106. The audio test system may further be configured to receive an output audio signal 126 from the T-Coil probe 116, after it has been amplified through the amplifier 118. A customizable audio test program in the audio test system 102 may further be configured to perform at least a comparison operation between the generated audio test signal 124 and the amplified output signal 126. Other various operations or audio test processes may be performed or configured using the customizable audio test program at the audio test system 102. Additional details of the audio test system and the process for generating the audio test signal 124 are provided in FIGS. 2 and 4 below.

The sound card 104 may be any electronic component capable of receiving information from the audio test system 102 and generating the audio test signal 124 from the computer 106 to the network 108 in a computer readable format. The sound card 104 may be communicatively coupled to audio test system 102 and computer 106 by any wireless or wired link. In one embodiment, the communications link between audio test system 102 and sound card 104 is contained within the computer 106. In another embodiment, the communications link between sound card 104 and audio test system 102 may be external to the computer 106 and provided using wires or wireless connections. Other various links may be also implemented.

The computer 106 may be any computing device capable of providing the audio test signal 124 through the sound card 104, and providing the audio test signal 124 from the source VoIP application 128 to the client VoIP application 114 through the network 108. The computer 106 may be, for example, an application server, a backup platform, an archival platform, a media server, a personal computer, a desktop platform, a laptop platform, a mobile device, a combination of one or more of the foregoing, or another computing platform communicatively coupled to the network 108 and the amplifier 118. The computer 106 may also be communicatively coupled to sound card 104 to generate the audio test signal 124 and receive the output audio signal 126. The computer 106 may also be communicatively coupled to the network 108 via any wireless or wired link. In one embodiment, the computer 106 is connected to the network 108 via an Ethernet cable. The computer 106 may also be configured to provide the audio test signal to the source VoIP application 128 through specialized software. For example, in one embodiment, the computer 106 may include a third-party VoIP client application, e.g., MICROSOFT® SKYPE or other similar VoIP application, to provide the audio test signal 124 to source VoIP application 128.

The network 108 may be a local area network (LAN), a wide area network (WAN), the Internet, a cellular network, a satellite network, or another network that permits communication between the computer 106, the wireless base station 110, the source VoIP application 128, the client VoIP application 114, and other devices communicatively coupled to the network 108. The network 108 may further include one, or any number, of the exemplary types of networks mentioned above operating as a stand-alone network or in cooperation with each other. The network 108 may utilize one or more protocols of one or more clients or servers to which they are communicatively coupled. The network 108 may translate to or from other protocols to one or more protocols of network devices. Although the network 108 is depicted as one network, it should be appreciated that in some embodiments, the network 108 may comprise a plurality of interconnected networks. Other various network types or configurations may also be provided.

The wireless base station simulator 110 may be any device capable of simulating a base station operation for a wireless communication device. The wireless base station simulator 110, for example, may provide a wide range of potential signal strengths and other characteristics encountered in a typical wireless environment. The wireless base station simulator 110 may be communicatively coupled to the network 108 by any wired or wireless connection. In one embodiment, the wireless base station simulator 110 is coupled to the network 108 with an Ethernet cable. The wireless base station simulator 110 may also be communicatively coupled via the communications link 120 to a wireless communication device 112 by any wired or wireless communication method provided by the base station simulator 110. In one exemplary embodiment, the communications link 120 may be realized over an LTE communications channel. In one exemplary embodiment, the wireless base station simulator 110 may be a Rohde & Schwarz (R&S) CMW500 LTE base station simulator. Other various LTE-compliant base station simulators may also be used. It should also be appreciated that while LTE base station simulators are described herein, any wireless base station simulator operating under various wireless protocols may also be used.

The wireless communication device 112 may be any device capable of communicating with the wireless base station simulator 110 over the communications link 120 and providing an output signal 122 to T-coil probe 116. In one embodiment, the wireless communications device 112 may include a client VoIP application 114. In other embodiments, the client VoIP application 114 may be external or remote to the wireless communication device 112. In one implementation, the wireless communications device 112 may communicate with the wireless base station simulator 110 over LTE or another wireless protocol. The wireless communication device 112 may be communicatively coupled to T-coil probe 116. In one embodiment, wireless communication device 112 may transmit an output signal to T-coil probe 116 over T-coil communications link 122.

The client VoIP application 114 may be any application capable of receiving an audio signal, e.g., audio test signal 124, from the source VoIP application, via communications link 120 between the wireless base station simulator 110 and the wireless communications device 112. The client VoIP application 114 may be communicatively coupled with a source on the computer 106 via the communications link 120 and the network 108. In one embodiment, the network 108 may comprise the Internet. In one embodiment, the client VoIP application 114 may be a custom application with features optimized to conduct audio signal testing. In another embodiment, the client VoIP application 114 may be a third-party VoIP client application, such as a MICROSOFT® SKYPE application. The client VoIP application 114 may further be embedded within the wireless communication device 112. The client VoIP application 114 may also be communicatively coupled to the wireless communication device 112 by internal circuitry, or by wired or wireless communication links (not shown).

The T-coil probe 116 may be any device capable of receiving a T-coil compatible output signal. In one embodiment, the T-coil probe 116 may be communicatively coupled to the wireless communication device 112 via T-coil communications link 122. In another embodiment, the T-coil probe 116 may be communicatively coupled to the amplifier 118. In one exemplary embodiment, the output signal 126 may be provided over a BNC cable. As described in more detail below, the output signal 126 from the T-coil probe may be amplified and sent to the audio test system 102 via the sound card 104 for comparison to the original audio test signal 124, or for other audio test processes.

The amplifier 118 may be any device capable of receiving the output audio signal 126, and generating an amplified output audio signal for transmission via the sound card 104 to the audio test system 102. In one embodiment, the amplifier 118 may be communicatively coupled to the T-coil probe 116 and the sound card 104 via wired or wireless links.

The data communications link 120 may be a wired or wireless connection between wireless base station simulator 110 and wireless communication device 112. The data communications link 120 may be implemented over any wireless or cellular technology providing communication between base station simulator 110 and wireless communication device 112. In one exemplary embodiment, the data communications link 120 may be implemented over LTE. In another embodiment, data communications link may be a radio frequency (RF) cable connecting the wireless base station simulator 110 to the wireless communication device 112.

As describe above, the T-coil communications link 122 may be a wireless coupling between the wireless communication device 112 and the T-coil probe 116. The T-coil communications link 122 may provide wireless transmission of an audio signal, for example, output signal 122, from the wireless communication device 112, which is received by the T-Coil probe 116. In one exemplary embodiment, the T-coil link 122 may be implemented using variations of an electromagnetic signal.

Also described above, the audio test signal 124 may be a test signal produced by the audio test system 102 for transmission to the wireless communication device 112 for testing the wireless communication device 112. In some embodiments, the audio test signal 124 may be provided with substantially reduced or minimal signal degradation to the wireless base station simulator 110. The audio test signal 124 may also be provided from the wireless base station simulator 110 to the wireless communication device 112 over the data communications link 120. The audio test signal 124 may be used, processed, or stored by the audio test system 102 for at least a comparison to the amplified output signal.

The output signal 126 may be a signal provided by the wireless communication device 112 and received over the T-coil communication link 122 by the T-coil probe 116. The output signal 126 may be provided through the amplifier 118 back to the audio test system 102. In other embodiments, the output signal 126 may be provided directly to the audio test system 102 without an amplifier or with some other intermediary component. The output signal 126 and the audio test signal 124 may be compared by audio test system 102. In one embodiment, characteristics of the output signal 126 may be compared to the original audio test signal 124. For example, such a comparison may provide information to determine whether the wireless communications device 112 complies with FCC regulations for compatibility with T-coil devices.

The source VoIP application 128 may be any application capable of receiving an audio signal, e.g., audio test signal 124, from the audio test system 102. The source VoIP application 128 may be communicatively coupled with a client on the wireless communication device 112 via the communications link 120 and the network 108. In one embodiment, the network 108 may comprise the Internet. In one embodiment, the source VoIP application 128 may be a custom application with features optimized to conduct audio signal testing. In another embodiment, the source VoIP application 128 may be a third-party VoIP client application, such as a MICROSOFT® SKYPE application. The source VoIP application 128 may further be embedded within the computer 106. The source VoIP application 128 may also be communicatively coupled to the computer 106 by internal circuitry, or by wired or wireless communication links (not shown).

Figure 2:
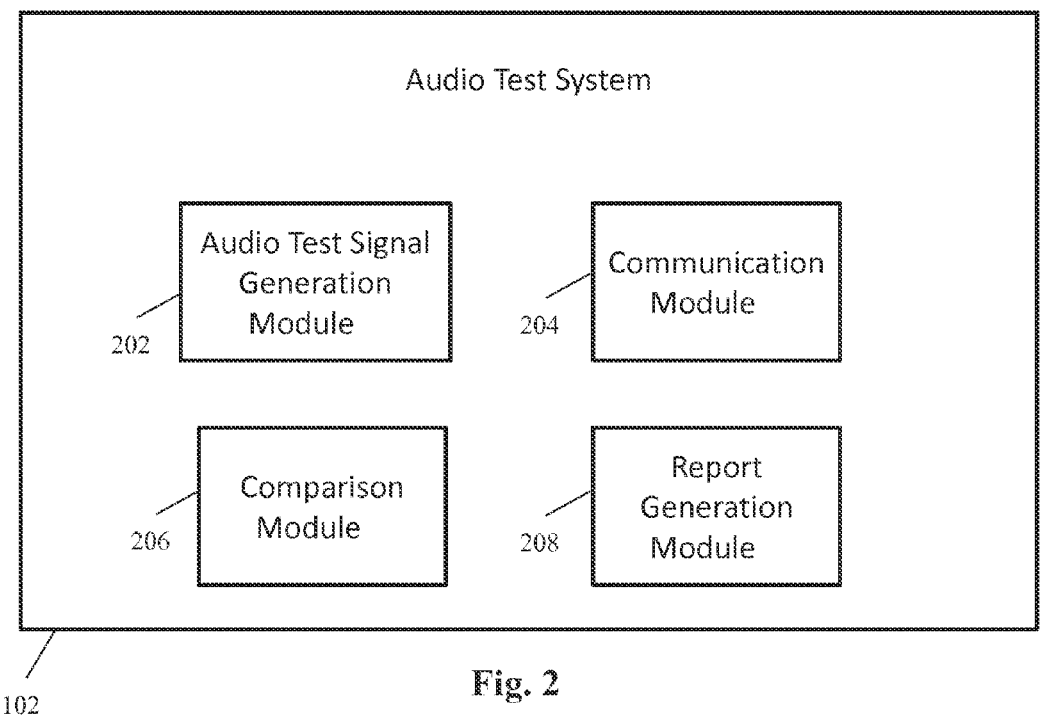
FIG. 2 depicts an illustrative audio test system in accordance with an exemplary embodiment.

FIG. 2 depicts an illustrative audio test system in accordance with an exemplary embodiment of the disclosure. Referring to FIG. 2, the audio test system 102 may include an audio test signal a generation module 202, a communication module 204, a comparison module 206, and a report generation module 208. It should be appreciated that these modules may be implemented in software or hardware, and may be communicatively coupled via virtual or physical links.

The audio test signal generation module 202 may be configured to generate the audio test signal 124 for use in the wireless communications device 112. In other embodiments, the audio test signal generation module 202 may generate any audio signal for use in a variety of testing environments for a variety of communications devices.

In one embodiment, the audio test signal generation module 202 may generate an initial audio test signal by generating a 1 kHz tone at a specific amplitude. In this embodiment, the audio test signal generation module 202 may follow the 1 kHz signal with a null (silent) signal. The audio test signal generation module 202 may then generate a signal from a selected speech signal file. This speech signal may be repeated, for example, three times. At this point, the audio test signal generation module 202 may stop transmitting, as the test cycle may be completed with the end of the third repetition. The number of repetitions may be reconfigured to a number greater or lesser than three depending on various factors, such as equipment demand, efficiency, and reliability.

The communication module 204 may be configured to receive or transmit an audio signal, for example, the output signal 122. The output signal 122 received by the communication module 204 may be generated by the wireless communication device 112 and broadcast over magnetic field. The output signal 122 may be received originally by the T-coil probe 116. The communication module may receive an amplified version of the output signal 122 by receiving the output of amplifier 118. As described above, the communication module 204 may also contain an integrated amplification module (not shown), or may receive unamplified output signal 122 directly.

The comparison module 206 may be configured to perform comparison operations on the audio test signal 124 and the output signal 126. The comparison module 206 may, among other things, compare the output signal 126 with the audio test signal 124, or may perform other operations on the output signal 126.

In one embodiment, the output signal 126 received by the T-coil probe 116 and generated by the wireless communication device 112 in response to the 1 kHz testing portion of the audio test signal 124 may be broken down by the comparison module 206 into a spectrum of ⅓ octave bands. In example, the comparison module 206 may measure the portion of the output signal 126 generated in response to the null signal portion of the audio test signal 124. This portion of the output signal 126 may correspond to environmental noise generated when the wireless communication device 112 receives the null portion of the audio test signal 124. The comparison module 206 may then find power in the 1 kHz band of the portion of the output signal 126 corresponding to the 1 kHz generated portion of audio test signal 124. The result of this operation, for example, may be named "ABM1." The comparison module 206 may then subtract the Half-Band Integrated power sum of the 300-3000 Hz band of the portion of output signal 126 corresponding to the null signal generated portion of the audio test signal 124. The result of this summation operation may be named "ABM2." Subtraction of ABM2 from ABM1 may be named the "SNNR" for the test.

In another embodiment, the comparison module 206 may measure the frequency response of the output signal 126. In this embodiment, the comparison module 206 may measure the portion of the output signal 126 generated in response to the speech signal file portion of the audio test signal 124. The comparison module 206 may record an averaged spectral intensity in ⅓ octave bands of a portion of the output signal 126 corresponding to the three portions of the audio test signal 124 corresponding to the three instances of the selected speech file. The comparison module 206 may then normalize the recorded frequency response spectrum for 0 dB at 1 kHz and apply a limit mask to determine the result of the test, which may be a pass or a fail. The limit mask chosen may depend on a value of ABM1 discussed above. After completing the frequency response portion of the test, ABM1, ABM2, and SNNR results as well as the frequency response margin results may be displayed for the user to record by the report generation module 208.

Figure 3:
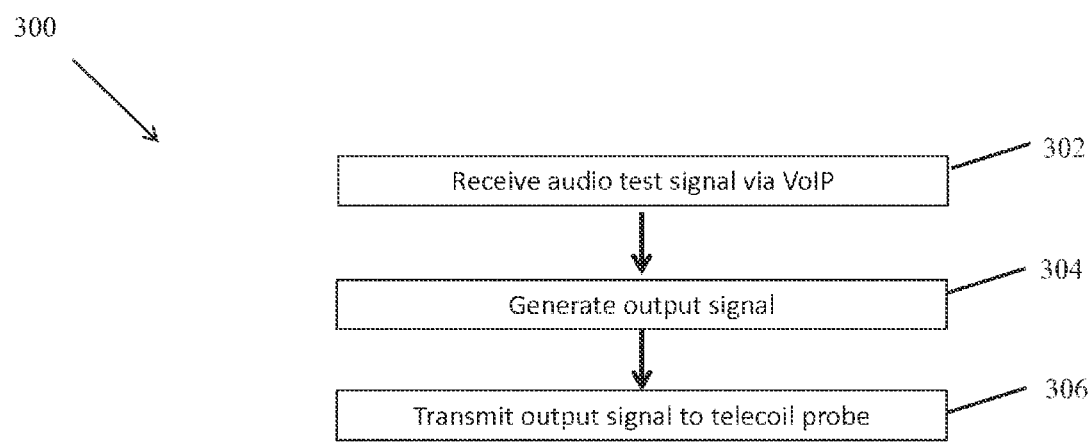
FIG. 3 depicts an illustrative flowchart of a method for testing a wireless communication device in accordance with an exemplary embodiment.

FIG. 3 depicts an illustrative flowchart of a method for testing a wireless communication device in accordance with an exemplary embodiment of the disclosure. The method 300 is provided by way of example, as there are a variety of ways to carry out methods disclosed herein. The method 300 shown in FIG. 3 may be executed or otherwise performed by one or a combination of various systems. The method 300 is described below as carried out by at least system 100 in FIG. 1 or system 102 in FIG. 2, by way of example, and various elements of system 100 or 102 are referenced in explaining the exemplary method of FIG. 3. Each block shown in FIG. 3 represents one or more processes, methods, or subroutines carried in the exemplary method 300. The method 300 may be further altered, e.g., by having blocks added, removed, altered, or rearranged. A non-transitory computer-readable medium comprising code, which when performed by a computer, may perform the acts of the method 300 may also be provided. Referring to FIG. 3, the exemplary method 300 may begin at block 302.

At block 302, an audio test signal 124 from a source VoIP application 128 may be received at a wireless communication device 112 using a client VoIP application 114. The audio test signal 124 may be generated by the audio test system 102. The audio test signal 124 may be transmitted digitally via the source VoIP application 128, and may simulate a number of frequencies suitable for testing.

At block 304, an output signal 126 may be generated by the wireless communication device 112. The output signal 126 may be generated in response to the audio test signal 124 received via the client VoIP application 114 at from the wireless base station simulator 110.

At block 306, the output signal 126 may be transmitted by the wireless communications device 112. This output signal 126 may be transmitted via a magnetic field, and may be received by a T-coil probe 116. The output signal 126 received by the T-coil probe may be transmitted directly, via amplification, or other ways, for processing and testing at the audio test system 102, as described above.

Figure 4:
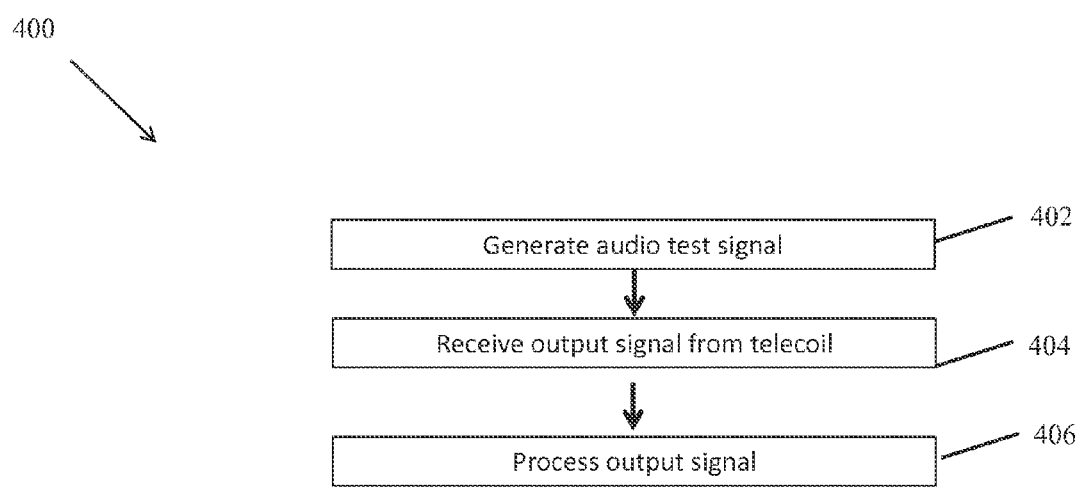
FIG. 4 depicts an illustrative flowchart of a method for generating test results in accordance with an exemplary embodiment.

FIG. 4 depicts an illustrative flowchart of a method for generating test results in accordance with an exemplary embodiment of the disclosure. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system 100 in FIG. 1 or system 102 in FIG. 2, by way of example, and various elements of system 100 or 102 are referenced in explaining the exemplary method of FIG. 4. Each block shown in FIG. 4 represents one or more processes, methods, or subroutines carried in the exemplary method 400. The method 400 may be further altered, e.g., by having blocks added, removed, altered, or rearranged. A non-transitory computer-readable medium comprising code, which when performed by a computer, may perform the acts of the method 400 may also be provided. Referring to FIG. 4, the exemplary method 400 may begin at block 402.

At block 402, an audio test signal 124 may be generated by the audio test system 102. For example, the audio test signal generation module 202 of the audio test system 102 may generate the audio test signal 124.

At block 404, an output signal is received at the audio test system 102. The output signal may be transmitted to audio test system 102 directly or indirectly from T-coil probe 116, although this is not required. In another embodiment, the output signal may be provided by T-coil probe 116, as described above.

At block 406, the received output signal 126 may be processed at the comparison module 206 of the audio test system 102. In one embodiment, the processing may comprise generating test results that may be either a "pass" or a "fail," indicating the results of the test of the wireless communication device. These results may be displayed to a user via the report generation module 208 of the audio test system 102. These results may also provide comparison data that may be logged or stored in memory (not shown) and used to determine appropriate characteristics of the testing of the wireless communications device 112, as described above.

The subject matter described herein may be implemented in digital electronic circuitry, or in computer software, firmware, or hardware, including the structural means disclosed in this specification and structural equivalents thereof, or in combinations of them. The subject matter described herein may be implemented as one or more computer program products, such as one or more computer programs tangibly embodied in an information carrier (e.g., in a machine-readable storage device), or embodied in a propagated signal, for execution by, or to control the operation of, a data processing apparatus (e.g., a programmable processor, a computer, or multiple computers). A computer program (also known as a program, software, software application, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file. A program may be stored in a portion of a file that holds other programs or data, in a single file dedicated to the program in question, or in multiple coordinated files (e.g., files that store one or more modules, subprograms, or portions of code). A computer program may be deployed to be executed on one computer or on multiple computers at one site or distributed across multiple sites and interconnected by a communication network.

The processes and logic flows described in this specification, including the method steps of the subject matter described herein, may be performed by one or more programmable processors executing one or more computer programs to perform functions of the subject matter described herein by operating on input data and generating output. The processes and logic flows may also be performed by, and apparatus of the subject matter described herein may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory may be supplemented by, or incorporated in, special purpose logic circuitry.

The description herein describes network elements, computers, and/or components of a system and method for providing a bundled product and/or service along with an insurance policy that may include one or more modules. As used herein, the term "module" refers to computing software, firmware, hardware, and/or various combinations thereof. At a minimum, however, Modules, are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules may share the same physical hardware (e.g., two different modules may use the same processor and network interface). The modules described herein may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another.

Additionally, the modules may be moved from one device and added to another device, and/or may be included in both devices. To provide for interaction with a user, the subject matter described herein may be implemented on a computer having a display device, e.g., a CRT (cathode ray tube) or LCD (liquid crystal display) monitor, for displaying information to the user and a keyboard and a pointing device, (e.g., a mouse or a trackball), by which the user may provide input to the computer. Other kinds of devices may be used to provide for interaction with a user as well. For example, feedback provided to the user may be any form of sensory feedback, (e.g., visual feedback, auditory feedback, or tactile feedback), and input from the user may be received in any form, including acoustic, speech, or tactile input.

The subject matter described herein may be implemented in a computing system that includes a back-end component (e.g., a data server), a middleware component (e.g., an application server), or a front-end component (e.g., a client computer having a graphical user interface or a web browser through which a user may interact with an implementation of the subject matter described herein), or any combination of such back-end, middleware, and front-end components. The components of the system may be interconnected by any form or medium of digital data communication, e.g., a communication network. Examples of communication networks include a local area network (LAN) and a wide area network (WAN), e.g., the Internet.

The invention claimed is:

1. A system for testing a wireless communication device, comprising:
    an audio test system;
    a wireless base station simulator;
    a wireless communication device;
    a source VoIP application;
    a client VoIP application; and
    a telecoil probe;
    wherein the wireless communication device is configured to:
        receive, at the wireless communication device, an audio test signal from the wireless base station simulator, wherein the audio test signal is transmitted via the source VoIP application;
        generate an output signal in response to the audio test signal; and
        transmit an output signal to the telecoil probe, wherein the telecoil probe is communicatively coupled to the audio test system for testing the wireless communication device.

2. The system of claim 1, wherein the client VoIP application is in the wireless communications device.

3. The system of claim 1, wherein the wireless base station simulator is an LTE base station simulator.

4. The system of claim 1, wherein the output signal is amplified after being received by the telecoil probe.

5. The system of claim 1, wherein the audio test signal is generated by the audio test system.

6. The system of claim 1, wherein the audio test system processes the output signal by comparing the output signal with the audio test signal.

7. A method for testing a wireless communications device, comprising:
    receiving, at a wireless communication device, an audio test signal from a wireless base station simulator, wherein the audio test signal is transmitted from a source Voice over Internet Protocol (VoIP) application to a client VoIP application;
    generating an output signal in response to the audio test signal; and
    transmitting the output signal to a telecoil probe, wherein the telecoil probe is communicatively coupled with an audio test system configured to test the wireless communication device.

8. The method of claim 7, wherein the client VoIP application is in the wireless communications device.

9. The method of claim 7, wherein the wireless base station simulator is an LTE base station simulator.

10. The method of claim 7, wherein the output signal is amplified after being received by the telecoil probe.

11. The method of claim 7, wherein the audio test signal is generated by the audio test system.

12. The method of claim 11, wherein the audio test system is configured to test the wireless communication device by at least comparing the output signal with the audio test signal.

13. A non-transitory computer-readable storage medium storing a computer program of instructions configured to be readable by at least one computer processor for instructing the at least one computer processor to execute a computer process for performing the method of claim 7.

14. A method for testing a wireless communications device, comprising:
    generating an audio test signal, wherein the audio test signal is transmitted to a wireless communication device through a wireless base station simulator from a source VoIP application to a client a VoIP application;
    receiving an output signal, wherein the output signal is generated by the wireless communication device and transmitted to a telecoil probe; and
    processing the output signal by comparing the output signal with the audio test signal.

15. The method of claim 14, wherein the client VoIP application is in the wireless communications device.

16. The method of claim 14, wherein the wireless base station simulator comprises an LTE base station simulator.

17. The method of claim 14, wherein the output signal is amplified after being received by the telecoil probe.

18. The method of claim 14, wherein the processing the output signal further comprises breaking the output signal a spectrum of ⅓ octave bands.

19. The method of claim 14, wherein the generating the audio test signal further comprises generating a 1 kHz tone.

20. A non-transitory computer-readable storage medium storing a computer program of instructions configured to be readable by at least one computer processor for instructing the at least one computer processor to execute a computer process for performing the method of claim 14.

* * * * *